United States Patent
Balstad et al.

(10) Patent No.: US 10,807,853 B2
(45) Date of Patent: Oct. 20, 2020

(54) BEVERAGE DISPENSER

(71) Applicant: PepsiCo, Inc., Purchase, NY (US)

(72) Inventors: Robert William Balstad, New Milford, CT (US); Scott Thomas Loomis, Redlands, CA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 15/760,913

(22) PCT Filed: Sep. 13, 2016

(86) PCT No.: PCT/US2016/051530
§ 371 (c)(1),
(2) Date: Mar. 16, 2018

(87) PCT Pub. No.: WO2017/048716
PCT Pub. Date: Mar. 23, 2017

(65) Prior Publication Data
US 2018/0257919 A1 Sep. 13, 2018

Related U.S. Application Data

(60) Provisional application No. 62/219,993, filed on Sep. 17, 2015.

(51) Int. Cl.
*B67D 1/08* (2006.01)
*A47J 31/40* (2006.01)
(Continued)

(52) U.S. Cl.
CPC .......... *B67D 1/0086* (2013.01); *A47J 31/402* (2013.01); *A47J 31/41* (2013.01); *A47J 43/27* (2013.01);
(Continued)

(58) Field of Classification Search
CPC .. B67D 1/0084; B67D 1/0086; B67D 1/0022; B67D 1/0024; B67D 1/0034;
(Continued)

(56) References Cited

U.S. PATENT DOCUMENTS 2,887,250 A * 5/1959 Zilk ..................... B67D 1/0086
200/332.2
3,241,720 A * 3/1966 Walter ................. B67D 1/0084
200/314
(Continued)

FOREIGN PATENT DOCUMENTS

CN 101395086 A 3/2009
CN 103827018 A 5/2014
(Continued)

OTHER PUBLICATIONS

Extended European Search Report issued in European Patent Application No. 16847138.1, dated May 22, 2019.
(Continued)

*Primary Examiner* — Patrick M. Buechner
(74) *Attorney, Agent, or Firm* — Sterne, Kessler, Goldstein & Fox P.L.L.C.

(57) ABSTRACT

A liquid dispensing system having a handheld liquid dispense device with a body portion and a dispensing head. The dispensing system includes an ingredient system located remotely from the handheld liquid dispense device, piping extending from the ingredient system to the handheld liquid dispense device, the ingredient system having a plurality of beverage ingredient sources and configured to supply beverage ingredients to the piping for the dispensing of a beverage from the handheld liquid dispense device. The dispensing system may also include a user interface device
(Continued)

configured to receive a first user selection for a beverage and a second user selection for an ingredient modifying the beverage.

19 Claims, 8 Drawing Sheets

(51) Int. Cl.
    *B67D 1/00*     (2006.01)
    *A47J 31/41*     (2006.01)
    *A47J 43/27*     (2006.01)
    *G07F 13/06*     (2006.01)

(52) U.S. Cl.
    CPC .......... *B67D 1/0024* (2013.01); *B67D 1/0085* (2013.01); *B67D 1/0888* (2013.01); *B67D 1/0071* (2013.01); *G07F 13/06* (2013.01)

(58) Field of Classification Search
    CPC .. B67D 1/0036; B67D 1/0083; B67D 1/0085; B67D 1/0895; B67D 1/0857; B67D 1/0888; G07F 13/06; G07F 13/065
    See application file for complete search history.

(56) References Cited

U.S. PATENT DOCUMENTS

| | | |
|---|---|---|
| 3,863,810 A | 2/1975 | Hanson |
| 4,162,028 A | 7/1979 | Reichenberger |
| 4,619,378 A * | 10/1986 | de Man ................ B67D 1/0049 137/607 |
| 4,921,140 A * | 5/1990 | Belcham ............... B67D 1/0044 137/625.18 |
| 4,986,449 A | 1/1991 | Valiyee et al. |
| 6,196,422 B1 | 3/2001 | Tuyls et al. |
| 8,490,829 B2 * | 7/2013 | Deo ..................... B67D 1/0027 222/57 |
| 8,899,280 B2 * | 12/2014 | Deo ..................... B67D 1/0888 141/94 |
| 9,754,437 B2 * | 9/2017 | Deo ..................... B67D 1/0027 |
| 2004/0129725 A1 | 7/2004 | Bertone |
| 2005/0127098 A1 | 6/2005 | Bertone |
| 2007/0114244 A1 * | 5/2007 | Gatipon ............... B67D 1/0022 222/129.1 |
| 2008/0217358 A1 * | 9/2008 | Tavolazzi ............. B67D 1/0044 222/144.5 |
| 2009/0065570 A1 * | 3/2009 | Peters .................. B67D 1/0041 235/378 |
| 2009/0069934 A1 * | 3/2009 | Newman .............. B67D 1/0021 700/239 |
| 2010/0163572 A1 | 7/2010 | Downham |
| 2011/0054706 A1 * | 3/2011 | Murphy ............... B67D 1/0004 700/283 |
| 2011/0121032 A1 * | 5/2011 | Deo ..................... B67D 1/0027 222/145.1 |
| 2011/0315711 A1 | 12/2011 | Hecht et al. |
| 2012/0055954 A1 * | 3/2012 | Hecht .................... A47J 31/52 222/129.1 |
| 2013/0106690 A1 | 5/2013 | Lim |
| 2015/0046877 A1 * | 2/2015 | Cuppari ............... B67D 1/0015 715/834 |
| 2015/0191341 A1 | 7/2015 | Martindale et al. |
| 2016/0176696 A1 * | 6/2016 | Hecht .................. B67D 1/0888 222/144.5 |

FOREIGN PATENT DOCUMENTS

| | | |
|---|---|---|
| JP | 2009-057053 A | 3/2009 |
| WO | WO 2007/136904 A2 | 11/2007 |

OTHER PUBLICATIONS

International Search Report and Written Opinion of the International Searching Authority issued in International Application No. PCT/US2016/051530, dated Dec. 8, 2016.

* cited by examiner

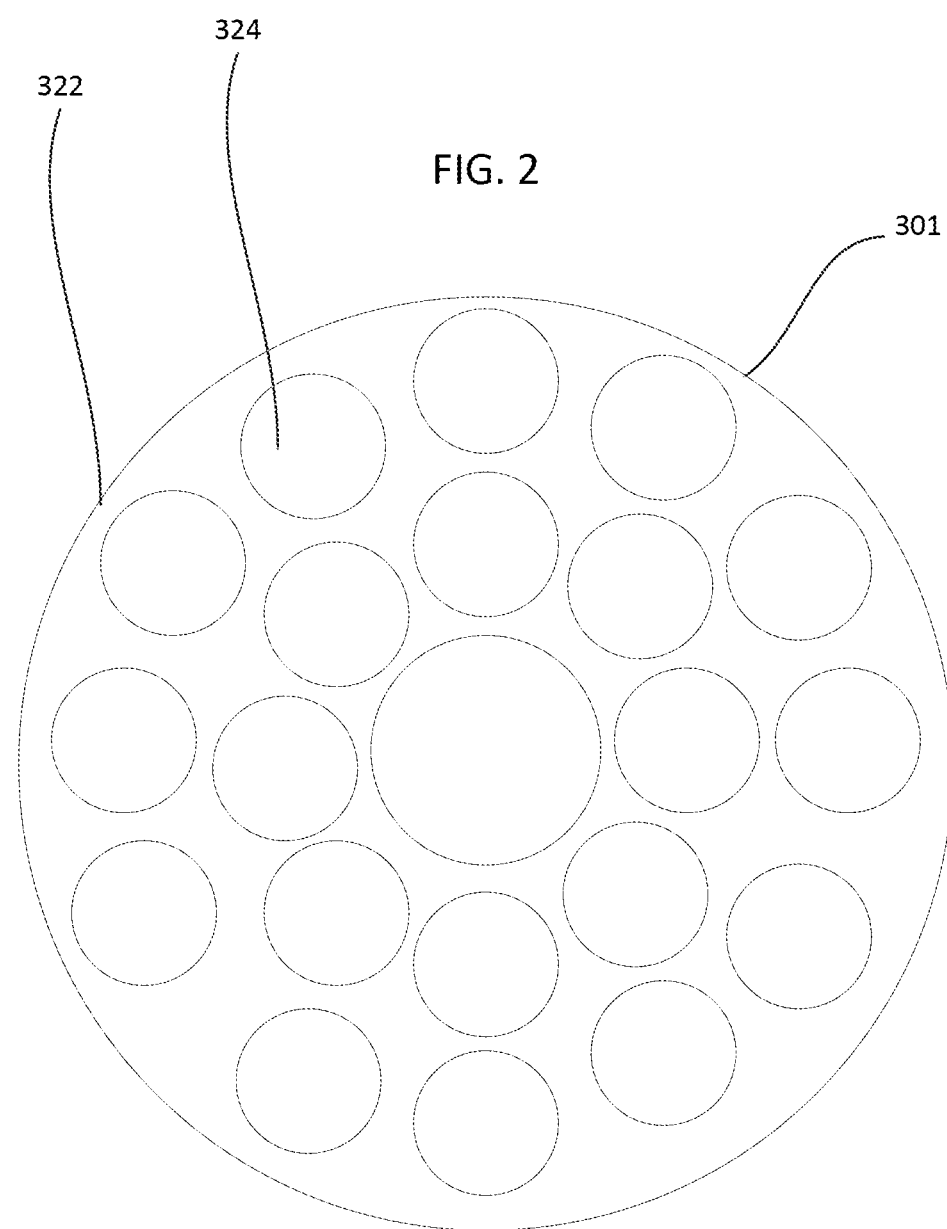

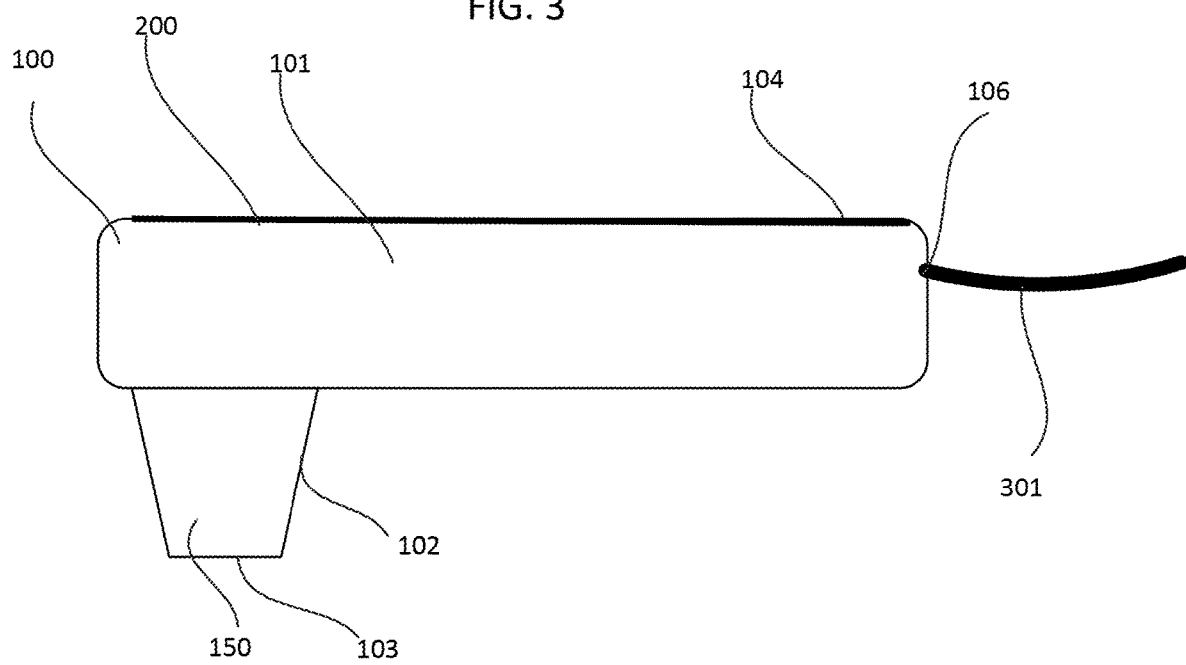

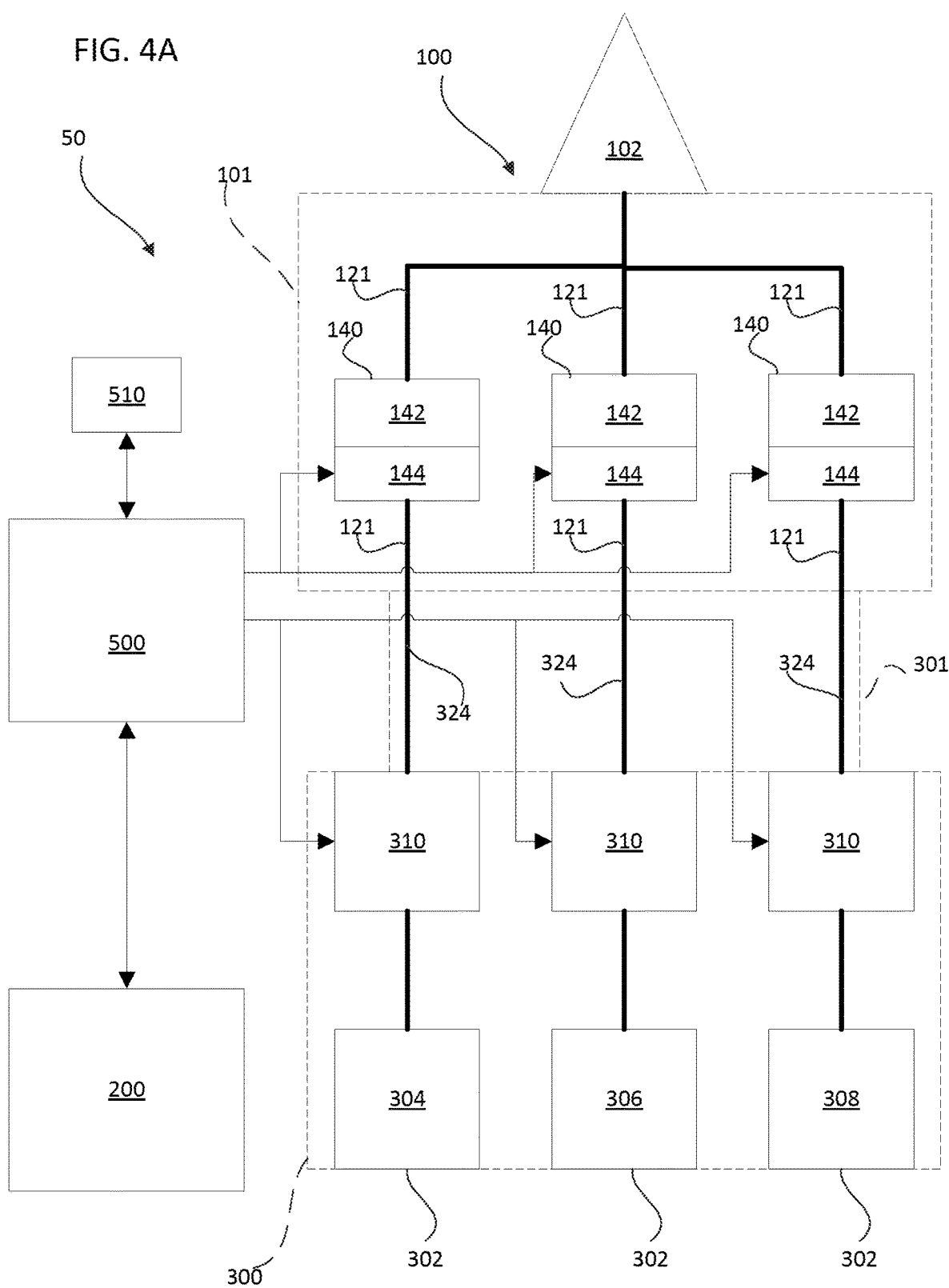

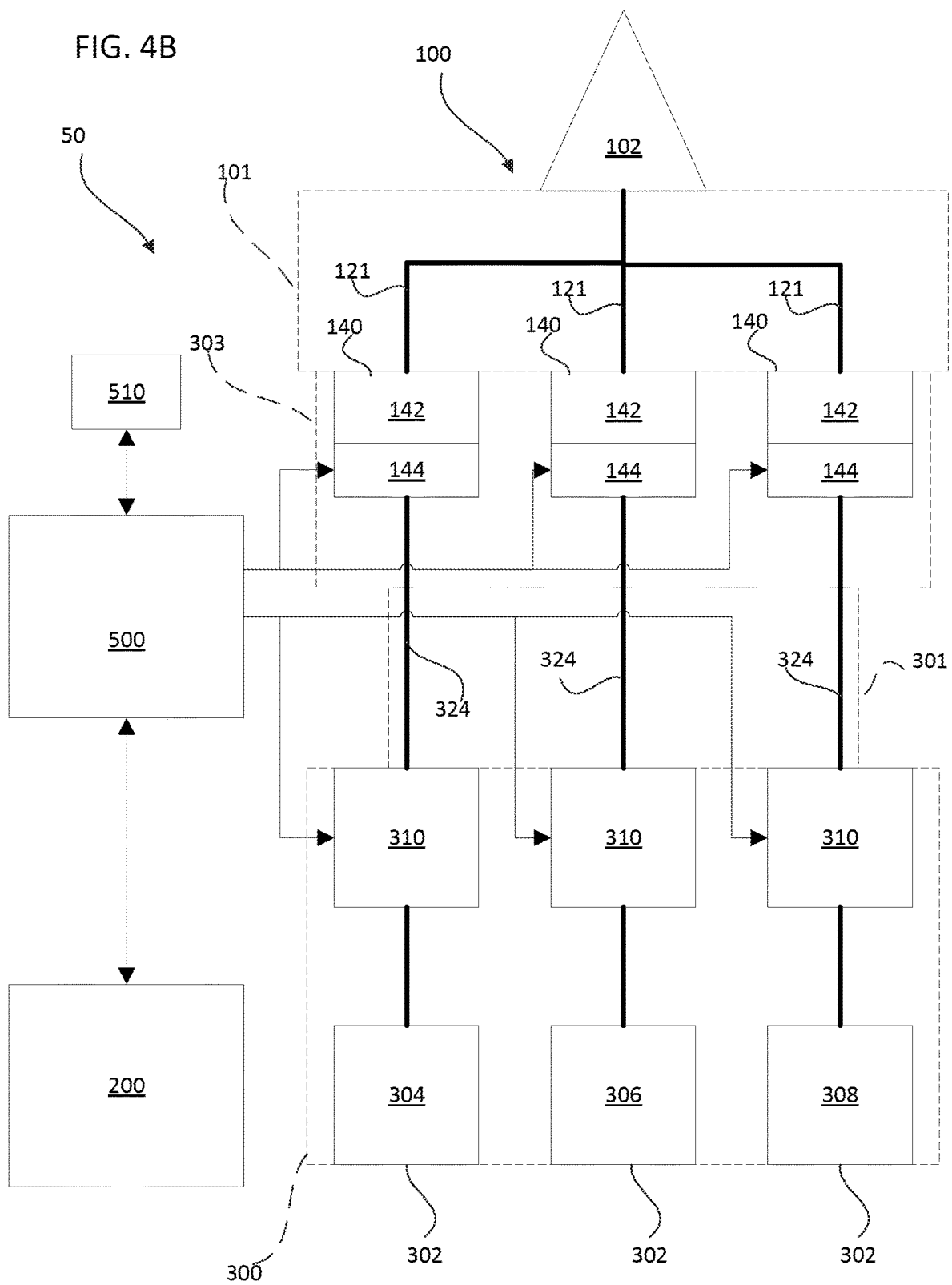

BEVERAGE DISPENSER

FIELD

This disclosure relates generally to a beverage dispensing system for the dispensing of beverage ingredients through a dispenser and more specifically for dispensing of beverage ingredients through a bar gun, soda gun or handheld dispenser.

BACKGROUND

Various beverage dispensers, such as those at restaurants, bars and other entertainment and/or food service venues, may typically have a handheld bar gun or soda gun. In conventional bar gun dispenser systems, the bar gun is coupled to a number of drink syrup supply sources via pipes dedicated to supply the particular drink syrup to the bar gun. A user will typically hold the bar gun over a cup and press a button on the bar gun to activate the dispenser so that the selected beverage is delivered from the dispensing head into the cup until pressure is withdrawn from the button.

Conventional bar guns are typically limited to dispensing drinks having dedicated buttons on the bar gun. Thus, a limited number of drinks are typically available at a conventional bar gun. For example, drinks typically available through a conventional bar gun are a regular cola beverage, a diet cola beverage, perhaps one or several non-cola carbonated beverages, such as a lemon-lime flavored carbonated beverage or some other fruit-flavored drink (e.g., orange flavored carbonated beverage, and/or root beer), and perhaps one more non-carbonated beverage(s), such as a tea and/or a lemonade.

Conventional bar guns are not typically configured to permit a user to generate or receive a custom-ordered beverage that a consumer may wish to purchase, e.g., a cola flavored with cherry, vanilla, lemon, or lime, etc., or a tea flavored with lemon, orange, peach, raspberry, etc.

What is needed is a bar gun system that does not have the limitations and disadvantages of conventional bar gun dispensers and methods.

SUMMARY

In one embodiment a dispensing system is provided, such as for dispensing beverages including soda.

Handheld liquid dispense devices having a body portion and a dispensing head are described herein. The dispensing system may include a central ingredient system located remotely from the handheld liquid dispense device including piping extending from the ingredient system to the handheld liquid dispense device. The ingredient system may have a plurality of beverage ingredient sources and may be configured to supply beverage ingredients through the piping for the dispensing of a beverage from the handheld liquid dispense device. The dispensing system may also include a user input device configured to receive at least a first user selection for a beverage and a second user selection for an ingredient modifying the beverage. The ingredient modifying the beverage may be a flavor addition syrup or flavor shot.

The liquid dispensing system may include a plurality of flow control valves with each flow control valve associated with a beverage ingredient. The liquid dispensing system may be configured to simultaneously dispense multiple beverage ingredients at predetermined flow rates based on a beverage selection.

It will be appreciated by those skilled in the art, given the benefit of the following description of certain exemplary embodiments of the dispensing system disclosed herein, that at least certain embodiments disclosed herein have improved or alternative configurations suitable to provide enhanced benefits. These and other aspects, features and advantages of this disclosure or of certain embodiments of the disclosure will be further understood by those skilled in the art from the following description of exemplary embodiments taken in conjunction with the following drawings.

BRIEF DESCRIPTION OF THE DRAWINGS

FIG. 2 is a cross-sectional schematic view of piping for use with a dispensing system according to aspects of the disclosure.

FIG. 3 is side view of an embodiment of a bar gun according to various aspects of the disclosure.

FIG. 4A illustrates a schematic view of elements of a dispensing system according to aspects of the disclosure.

FIG. 4B illustrates a schematic view of elements of a dispensing system according to aspects of the disclosure.

DETAILED DESCRIPTION OF THE PREFERRED EMBODIMENTS

Figure 1A:
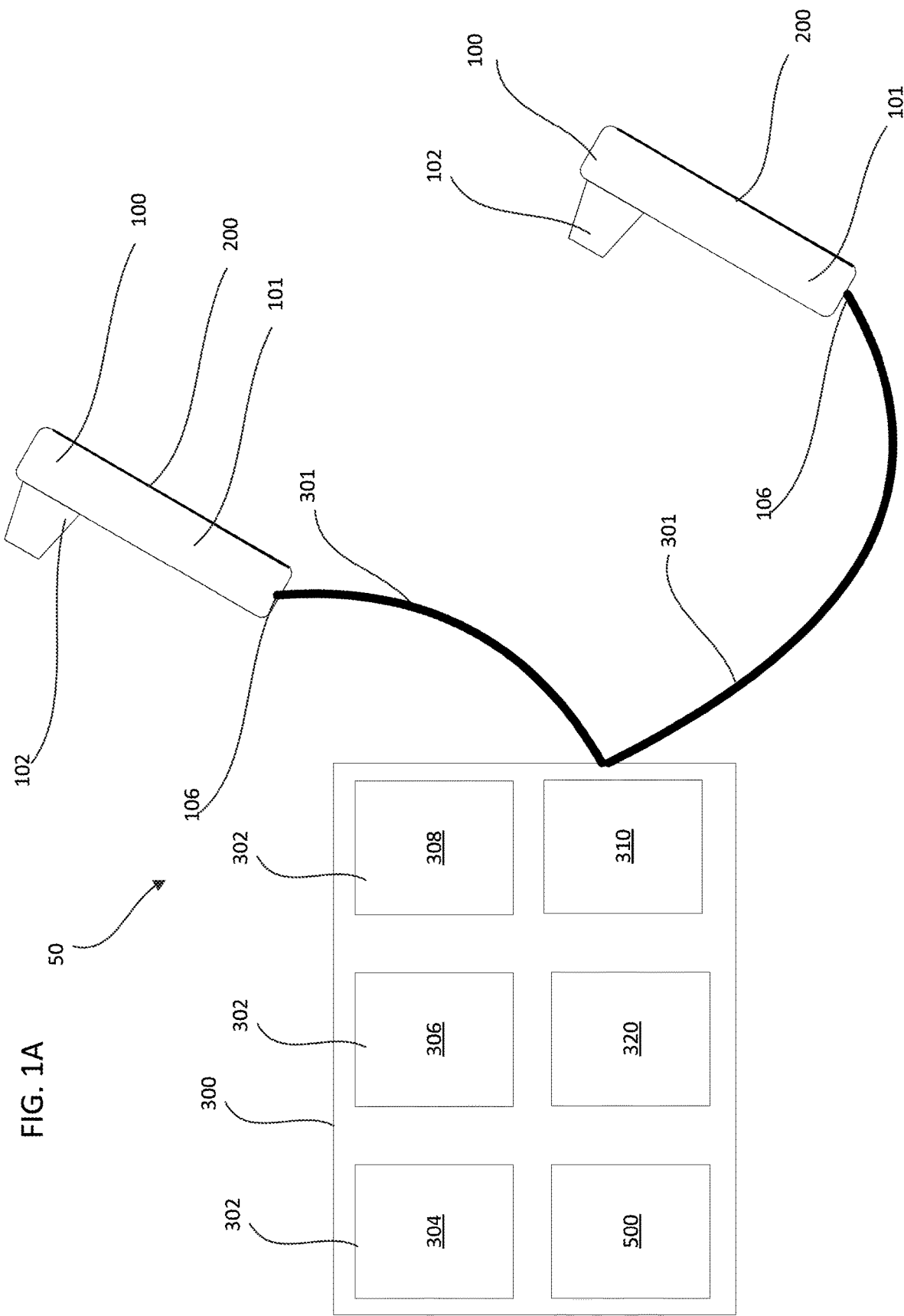
FIG. 1A illustrates an embodiment of a dispensing system including bar guns according to aspects of the disclosure.

While the invention(s) described herein are susceptible of embodiments in many different forms, there are shown in the drawings and will herein be described in detail exemplary embodiments of the invention(s) with the understanding that the present disclosure is to be considered as an exemplification of the principles of the invention(s) and is not intended to limit the broad aspects of the invention(s) to the embodiments illustrated. It is to be understood that other embodiments may be utilized, and structural and functional modifications may be made, without departing from the scope and spirit of the present disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

In the following description of various example structures according to the invention(s), reference is made to the accompanying drawings, which form a part hereof, and in which are shown by way of illustration various example devices, systems, and environments in which aspects of the invention(s) may be practiced. It is to be understood that other specific arrangements of parts, example devices, systems, and environments may be utilized and structural and functional modifications may be made without departing from the scope of the present invention(s). Also, while the terms "top," "bottom," "front," "back," "side," "rear," "upward," "downward," and the like may be used in this specification to describe various example features and elements of the invention(s), these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of the invention(s). Also, the reader is advised that the attached drawings are not necessarily drawn to scale.

In general, aspects of this disclosure relate to systems and methods for dispensing liquids. According to various aspects and embodiments, the dispenser may be formed of one or more of a variety of materials, such as metals (including metal alloys), plastics, polymers, and composites, and may be formed in one of a variety of configurations, without departing from the scope of the invention(s).

The various figures in this application illustrate examples of dispensing systems according to this disclosure. When the same reference number appears in more than one drawing, that reference number is used consistently in this specification and the drawings refer to the same or similar parts throughout.

The embodiments discussed below may be used to form a wide variety of beverages, including but not limited to cold and hot beverages, and including but not limited to beverages known under any PepsiCo branded name, such as Pepsi-Cola®.

A dispensing system 50 according to aspects of this disclosure is shown in at least FIGS. 1-6. Dispensing systems 50 according to aspects of this disclosure may be used to dispense liquids including beverages such as carbonated beverages including soda. The dispensing system 50 can generally include one or more dispense devices 100, which may be a bar gun, soda gun, or other handheld liquid dispensing device (handheld dispenser). Each dispense device 100 may include a body 101 and at least one dispensing head or nozzle 102. Each of the dispense devices 100 may also include one or more user interface devices 200 that may be used by a user to select the type of liquid or beverage to be dispensed and/or combinations of beverage ingredients such that a user may select a custom beverage.

The dispensing system 50 may also include an ingredient system 300 located remotely from the dispense device(s) 100 and connected to the dispense location 100 by piping 301. The ingredient system 300 is configured to supply the dispense device(s) 100 with beverage ingredients including, for example, water, various syrups and flavorings, and various micro ingredients. In some embodiments, the dispensing system 50 may include a single dispense device 100 connected by piping 301 to a common ingredient system 300. In some embodiments the dispensing system 50 may include multiple dispense devices 100 each connected by piping 301 to a common ingredient system 300. In some embodiments, the dispensing system 50 may be a modular system having a plurality of dispense devices 100 each connected to a central ingredient system 300.

Figure 1B:
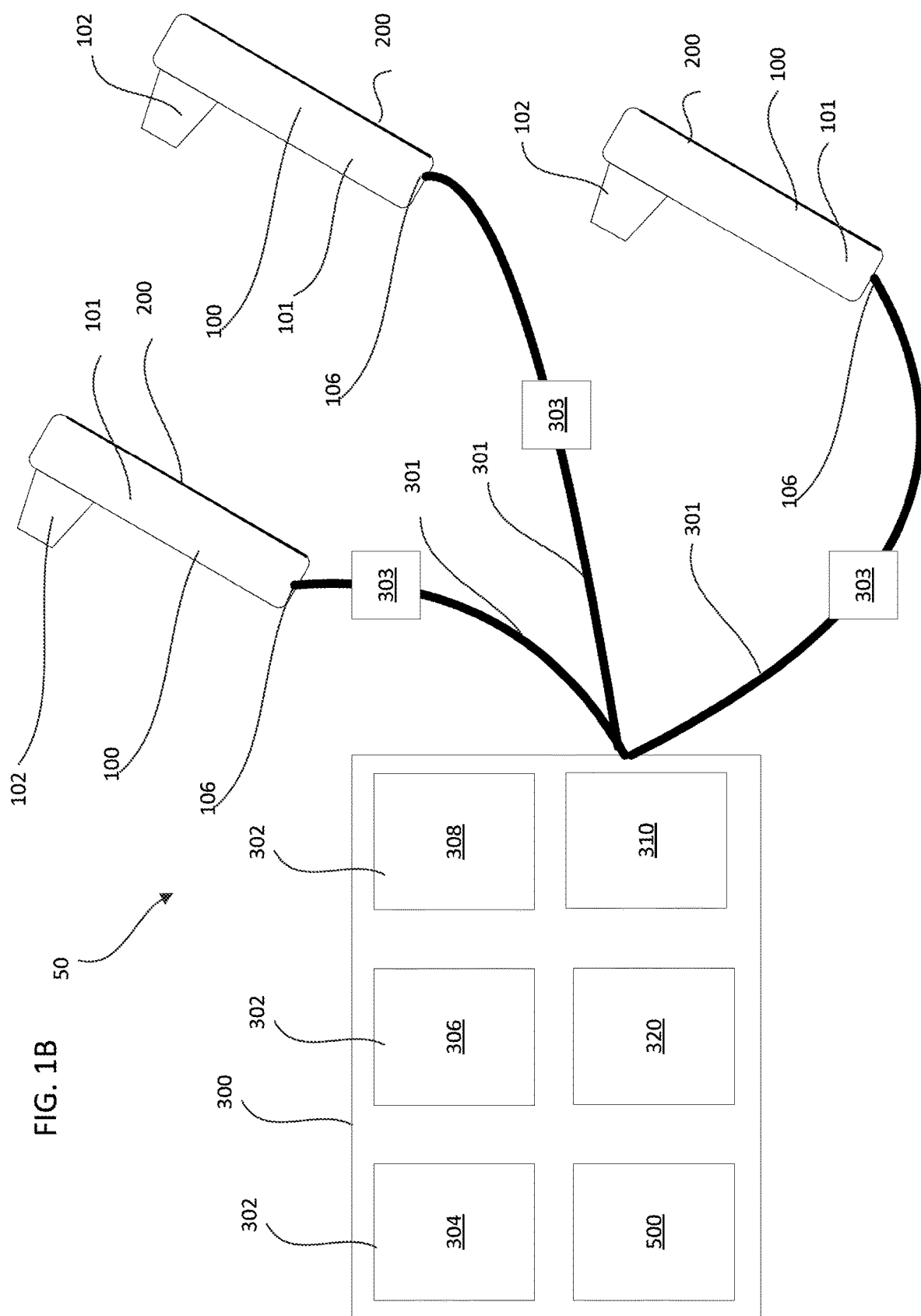
FIG. 1B illustrates an embodiment of a dispensing system including bar guns according to aspects of the disclosure.

Referring now primarily to FIGS. 1A-1B, the dispense device 100 may comprise a bar gun, soda gun, or other handheld liquid dispensing device. Each dispense device 100 may include a body 101 and at least one dispensing nozzle 102 configured to dispense liquid. Each dispense device 100 may also include one or more user interfaces 200, through which a user may select one or more different types of beverages and/or beverage ingredients to create a custom beverage. As will be discussed in greater detail below, the dispense device 100 may also include a connection point 106 which may be used to connect the dispense device 100 to the ingredient system 300 and/or piping 301.

The dispensing system 50 may include a single dispense device 100 connected to a remote ingredient system 300. In other embodiments, and as shown in FIGS. 1A and 1B, the dispensing system 50 may have a plurality of dispense devices 100, connected to a remote ingredient system 300. In still other embodiments, the dispensing system 50 may be modular having the ability to add additional dispense devices 100 each connected to the remote ingredient system 300. Referring to FIGS. 1A and 1B, a dispensing system 50 may be provided comprising one or more dispense devices 100, and an ingredient system 300 located remotely from the dispense device(s) 100. Piping 301 may extend from the ingredient system 300 to the dispense device(s) 100. In some embodiments, as shown for example in FIG. 1B the dispensing system 50 may also include a manifold 303 connected by piping 301 to each of the dispense devices 100 and the remote ingredient system 300 by piping 301.

The ingredient system 300 may have a plurality of sources or reservoirs of beverage ingredients. The ingredient system 300 may comprise a plurality of highly concentrated ingredients for preparation of a wide variety of beverages. Each beverage ingredient 302 may be stored in a storage container or reservoir. The beverage ingredients 302 are configured to be dispensed from the dispense device 100. The storage containers may comprise cartridges, bags, or bag-in-box type containers, and any other suitable storage container. The beverage ingredients 302 may include, for example, soft drink syrups 304, and flavor ingredients or "flavor shots" 306. Beverage ingredients 302 may also include water or carbonated water 308. Syrups 304 and other beverage ingredients, including flavor ingredients 306, may include any of those provided by PepsiCo Inc. to form beverages known under any PepsiCo branded name, such as Pepsi-Cola®. In addition to those beverage ingredients listed above any other number of beverage ingredients may be included such as water, milk etc.

Syrup and other beverage ingredients 302, 304, 306, 308 may be pumped from the storage containers or other supply containers by pumps to dispense locations 100 as desired. As shown in FIGS. 1A and 1B, the ingredient system 300 may also include one or more pump assemblies 310 used to pump beverage ingredients 302 from the ingredient system 300 through piping 301 to the dispense device(s) 100. In some embodiments, each ingredient 302 may be associated with a separate pump assembly 310. In other embodiments, pump assemblies 310 may be associated with multiple ingredients 302. Pump assemblies 310 may also be used to pump other liquids through the piping 301 to the dispenser head(s) 102 such as cleaning solutions. The pump assemblies may be driven by $CO_2$ from a tank and supplied through a $CO_2$ gas branch line. These pumps may comprise conventional syrup pumps, e.g., BIP pumps.

As described above, a bag-in-a-box (BiB) may be used in some embodiments to provide beverage ingredients 302, such as soft drink syrup, to the dispense device(s) 100. In some embodiments, multiple BiB may be stacked or placed on rack. In some embodiments, BiB may include a bag or bladder, composed of plastic or metalized film within a corrugated fiberboard box. In some embodiments, the dispensing system 50 may include an electronic level sensor to determine the level of contents within the bladder.

The ingredient system 300 may include other systems including, for example, ingredient treatment systems 320.

The ingredient treatment system 320 may be used to treat the ingredients 302. For example, ingredient treatment system 320 may be used to cool ingredients 302 to a desired temperature for a cold beverage and/or may be used to heat ingredients to a desired temperature for hot beverages. Ingredient temperature ranges provided by ingredient treatment system(s) 320 may be from just below about freezing (e.g., to create or prepare a slurry or slush product) through about 180 degrees Fahrenheit (e.g. to create or prepare a hot beverage, such as a coffee or tea).

The ingredient treatment system 320 may also be any suitable treatment system that may improve taste, reduce odor, and/or reduce chlorines. The ingredient treatment system 320, may, for example, be a water treatment system that may improve water quality to near pure water through systems, including but not limited to reverse osmosis (RO). Treated ingredients, including water, from the ingredient treatment system(s) 320 may be provided to dispense device (s) 100.

FIG. 2 depicts a cross-sectional view of one embodiment of piping 301, also referred to herein as main bundle 301. As shown in FIG. 3, piping or main bundle 301 comprises an outer pipe 322, and bundle of smaller inner pipes 324. Inner pipes 324 may comprise any beverage ingredient 302 including beverage/syrup lines, flavoring lines, and water and carbonated water lines. In other embodiments, piping 301 may include multiple separate inner pipes 324 without having an outer pipe 322.

The piping 301 may also include a return line or water return line. The return line may, for example, allow for the circulating of water that is not dispensed from a dispensing head 102 to be returned to ingredient system 300.

Referring now to FIGS. 3, 4A and 4B; FIG. 3 depicts a dispense device 100 comprising a bar gun, soda gun, or other handheld liquid dispensing device according to aspects of this disclosure, and FIGS. 4A and 4B schematically illustrate an electronically controlled dispensing system 50 including internal portions of the dispense device 100 in accordance with aspects of this disclosure. As described above, the dispense device 100 may include a body 101 and a dispensing nozzle 102 configured to dispense liquid. The dispense device 100 may also include one or more user interfaces 200, through which a user may select one or more different types of beverages and/or beverage ingredients to create a custom beverage.

As shown in FIG. 4A, beverage ingredients 302, which may include, for example, soft drink syrups 304, flavor ingredients 306 and water 308, are connected to pump assemblies 310. The ingredients 302 and pump assemblies 310 are connected to the dispense device 100 via piping 301 such that ingredients 302 may be pumped to the dispense device 100. The dispense device 100 and/or dispenser body 101 may comprise a plurality of conduits 121 through which the beverage ingredients 302 may flow into the nozzle 102. In some embodiments, the body 101 of the dispense device 100 may include separate conduits 121 associated with each of the beverage ingredients 302 supplied to the dispense device 100 from the ingredient system 300 and/or piping 301. In some embodiments, the body 101 may include common conduits 121 through which multiple different ingredients 302 may flow.

The dispense device 100 may also include valve assemblies 140 associated with each beverage ingredient supplied to the dispense device from the ingredient system 300 and/or piping 301. Each beverage ingredient 302 supplied to the dispense device 100 from the ingredient system 300 and/or piping 301 may be associated with a valve assembly 140. For example, each beverage ingredient conduit 121 within the dispense device may be associated with a valve assembly 140. The valve assemblies 140 may comprise a flow control valve 142 and an activation device 144 capable of activating or adjusting the associated flow control valve 142. In some embodiments, the activation device 144 may be a solenoid. Each valve assembly 140 may control the flow of a specific beverage ingredient 302 through the dispense device 100 to provide each ingredient to the nozzle 102 at a predetermined flow rate. Although valve assemblies 140 are shown in FIG. 4A as within the dispense device body 101, the valve assemblies 140 may be located outside of the dispense device body 101. As shown, for example in FIG. 4B, in some embodiments, valve assemblies 140 may be located in manifolds 303. In other embodiments, for example, valve assemblies 140 may be located at the ingredient system 300. As will be discussed in greater detail below, in operation a user interface 200 and a controller or control unit 500 may control the appropriate pumps 310 and/or valve assemblies 140 to dispense the selected beverage and/or beverage ingredient(s) 302 at certain flow rates.

After exiting the associated valve assembly 140 the beverage ingredients 302 may flow to the nozzle 102. In some embodiments, the system 50 can be configured such that beverage and/or beverage ingredients 302 are configured to mix after exiting the nozzle 102 at the nozzle exit 103. In other embodiments, the dispense device 100 may include a mixing chamber 150 configured to mix beverages and/or beverage ingredients 302. In some embodiments, as shown in FIG. 3 for example, the nozzle 102 may be configured as a mixing chamber 150 and beverage and/or beverage ingredients 302 may mix within the nozzle 102. As discussed above, any beverage ingredients may be supplied to the dispense device 100. For example, a beverage of regular Pepsi-Cola®, may be formed by providing a syrup and carbonated water each a predetermined flow rate. In some embodiments, the mixture exiting the nozzle 102 and/or mixing chamber 150 at the nozzle exit 103 may have a ratio of beverage ingredient (or syrup) to water of about 5 to 1 by weight.

In some embodiments, the dispense device 100, may also include a post rinse system capable of substantially rinsing the dispense device 100. For example, in some embodiments, the mixing chamber 150 and/or nozzle 102 may include a post rinse system capable of substantially rinsing the mixing chamber 150 and/or nozzle 102 after dispensing a beverage. After a fluid is dispensed through the nozzle 102, a fluid or other rinsing material may enter the mixing chamber 150 to rinse the mixing chamber and substantially eliminate colorings and/or flavorings. In some embodiments, for example, the dispense device 100 may be configured to inject water and/or carbonated water into the mixing chamber 150 and/or nozzle 102 after a user dispenses a beverage. In some embodiments, for example, during dispensing of a beverage, the dispense device 100 may be configured to inject water and/or carbonated water into the mixing chamber 150 for a longer period of time than other ingredients such that the water and/or carbonated water rinses the mixing chamber 150 and/or nozzle 102.

In some embodiments, the dispense device 100 may include an ultraviolet cleaning device which may be used to clean, such as by killing and/or inactivating microorganisms, on the dispense device 100 particularly near the nozzle 102. In some embodiments the dispense device 100 may also include a refrigeration unit or heating unit to cool or heat beverage ingredients provided to the dispense device 100.

As described above, each dispense device 100 may include or be associated with one or more user interfaces 200. As shown for example in FIGS. 3, 5A and 5B, the user interface 200 may be located on a top surface 104 of the dispense device 100. In other embodiments, as shown for example in FIG. 6, the user interface 200 may be separate from the dispense device 100. The user interface 200 may include any components or group of components that allow a user to provide input to dispensing system 50. The components or group of components may be mechanical, electrical, or electromechanical. The user interface 200 may be a touch sensitive panel or pad and may be constructed of various layers including, for example, one or more electrode layers. In other embodiments the user interface may be a touch sensitive screen and may be constructed of various layers including, for example, one or more glass layers, electrode layers, insulating material and adhesives.

User interface 200 may support one or more touch sensitive areas, enabling user interaction via touch within those areas. The user interface device 200 may be implemented in accordance with one or more novel methods described herein. As one example, user interface device 200 may be used to provide instructions for dispensing a beverage. In one embodiment, user interface device 200 may allow a user to instruct dispensing system 50 to dispense a specific beverage formula and/or specific beverage ingredients 302. The user interface device 200 may also allow a user to customize a beverage or beverage formula, for example, by adding one or more flavor ingredients 306 or flavor additions.

As will be discussed in more detail below, the beverage dispensing system 50 may include one or more control units 500 which may be interfaced with user interface 200 to receive actions from user interface 200 and to perform other actions, for example, control unit 500 may control the dispensing system 50 to dispense beverages and/or beverage ingredients from the dispense device 100. Control unit 500 may, for example, control valve assemblies 140 and/or pumps 310.

Figure 5A:
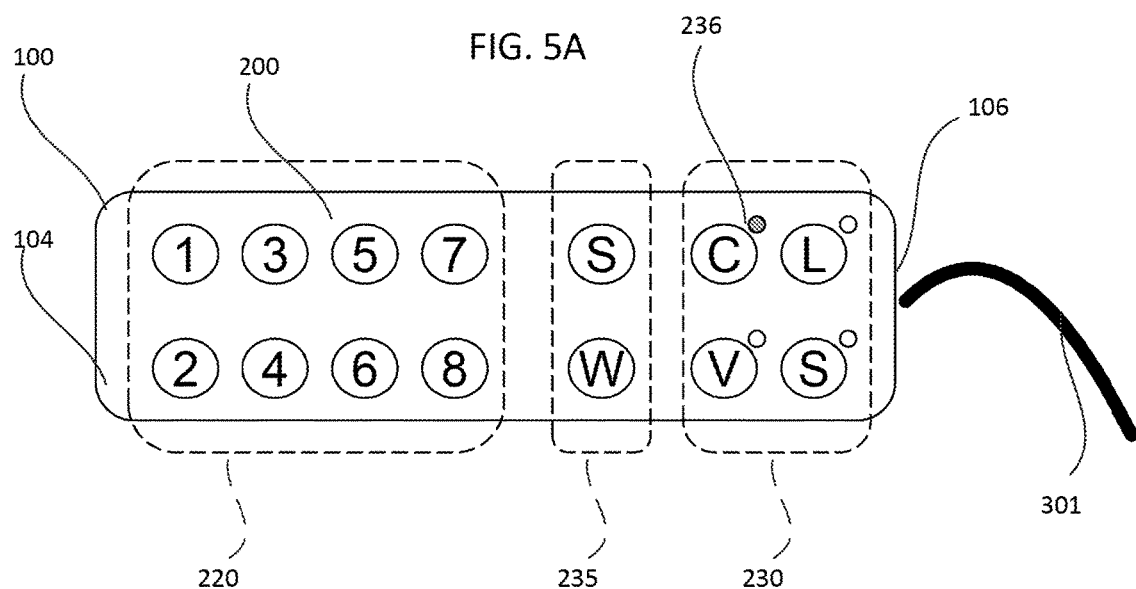
FIG. 5A is a top view of an embodiment of a bar gun showing a user interface device according to aspects of the disclosure.

FIG. 5A depicts one of the many possible arrangements of a user interface 200, given the disclosure herein. As described above, the user interface 200 may be included on a top surface 104 of the dispense device 100. In other embodiments, however, the user interface 200 may be located on other portions of the dispense device 100. The user interface 200 may include various beverage options for selection. In some embodiments, the user interface 200 may include various beverage options 220 including, for example, a regular cola beverage, a diet cola beverage, one or more non-cola carbonated beverages, such as a lemon-lime flavored carbonated beverage or some other fruit-flavored drink (e.g., orange flavored carbonated beverage, and/or root beer), and one or more non-carbonated beverages, such as a tea and/or a lemonade. The user interface may also include various flavor or ingredient addition or removal options 230 including, for example, vanilla, strawberry, raspberry, lemon, lime, etc. In some embodiments, the user interface 200 may also include water options 235 including for example options for noncarbonated water or carbonated water to dispense beverage ingredients 302 at certain flow rates.

The user interface 200 may also include indicators 236 to show which beverage 220, flavor or ingredient 230, and/or water 235 options are selected. The indicator(s) 236 may be lights, such as a light emitting diode. In other examples, the indicator may be a raised portion or other device capable of indicating to a user that a selection has been chosen. As shown in FIG. 5A, indicators 236 are shown associated with the flavor or ingredient options 230. Thus, a user may select a flavor or ingredient option 230 which will be added to a beverage 220 or water 235 selection chosen by the user. The indicator 236 indicates to the user which flavor or ingredient option is chosen. Beverage selection options 220 may be associated with beverage ingredients 302, flavor or ingredient selection options 230 may be associated with flavor ingredients or "flavor shots" 306, and water selection options may be associated with water or carbonated water 308.

To dispense a beverage from the dispensing device having a user interface 200 as shown in FIG. 5A a user may first select one or more flavor or ingredient options 230. Once the user has selected a flavor or ingredient option 230, an indicator 236 associated with the selected flavor or ingredient options 230 may activate indicating to the user the selected options 230. After selecting the flavor or ingredient options 230, the user may then select a beverage option 220 or a water option 235 to which the flavor or ingredient options 320 will be added. Once the beverage 220 or water 235 option is pressed by the user the selected beverage 220 and/or water 235 may be dispensed at a predetermined flow rate and the selected flavor or ingredient option 230 may be dispensed at another predetermined flow rate. The flow rates of the selected beverage 220, water 235, and/or ingredient options 230 may be controlled by valve assemblies 140. In embodiments, the user may select the beverage options 220, water options 235, and/or flavor ingredient options 230 in any order.

In one specific example, a user may first select a flavor or ingredient option 230 labeled "C" in FIG. 5A which may correspond with a cherry flavoring. Next the user may select a beverage option 220 labeled "1" in FIG. 5A which may correspond with a cola beverage. Once the user presses the indicator labeled "1" in FIG. 5A the dispense device 100 may simultaneously dispense a cola syrup at a first predetermined flow rate, carbonated water at a second predetermined flow rate, and cherry flavored syrup at a third predetermined flow rate until the user releases the beverage selection option 220. In some embodiments, as described above, the carbonated water may continue dispensing after the user releases the beverage selection option 220 to rinse any residual flavors or colorings from the nozzle 102.

Similarly, in another specific example, a user may want water 235 (carbonated water or noncarbonated water) with a flavor or ingredient 230 addition. In such an example, the user may first select a flavor or ingredient option 230 labeled "V" in FIG. 5A which may correspond with a vanilla flavoring. Next the user may a select a water option 235 labeled "S" in FIG. 5A which may correspond with carbonated water. Once the user presses the indicator labeled "S" in FIG. 5A, the dispense device 100 may simultaneously dispense carbonated water at a first predetermined flow rate, and vanilla flavored syrup at a second predetermined flow rate until the user releases the water selection option 235. In some embodiments, as described above, the water 235 may continue dispensing after the user releases the water selection option 235 to rinse any residual flavors or colorings from the nozzle 102.

Figure 5B:
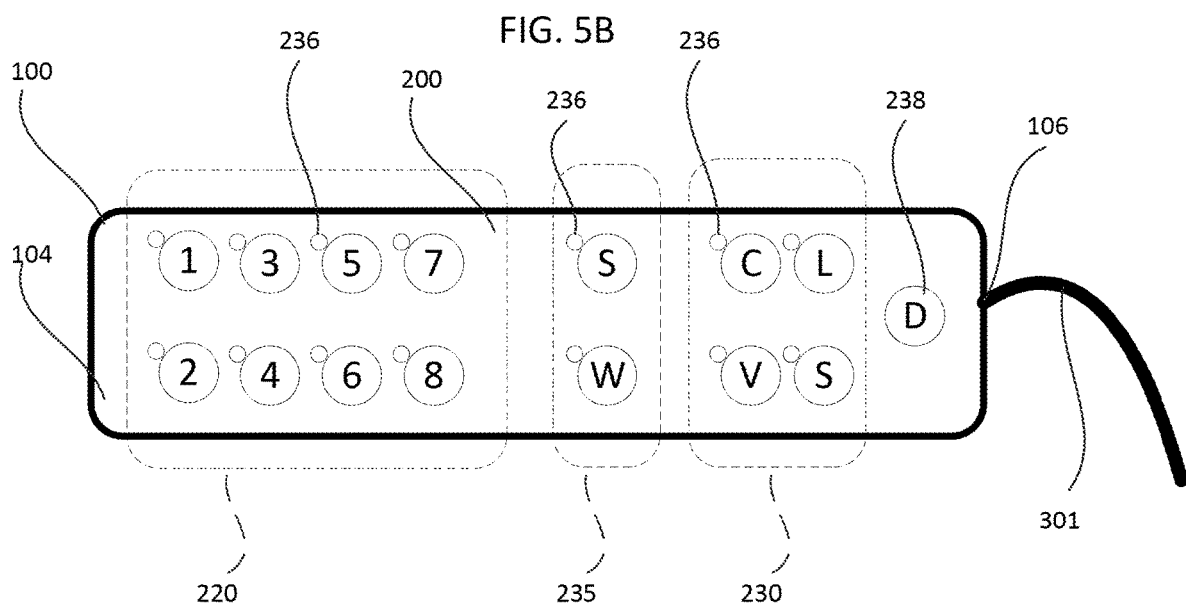
FIG. 5B is top view of an additional embodiment of a bar gun showing a user interface device according to aspects of the disclosure.

In some embodiments, the user interface 200 and/or dispense device 100 may include a separate dispense button 238 to dispense a selected beverage. For example, as shown in FIG. 5B, the user interface 200 may also include indicators 236 associated with each of the beverage 220, flavor or ingredient 230, and water 235 options. To dispense a beverage from the dispensing system 50 having a user interface 200 as shown in FIG. 5B, a user may select one or more flavor or ingredient options 230 and a beverage option 220 or a water option 235 to which the flavor or ingredient option will be added. Indicators 236 may show the user which beverage options have been selected. The user may then press the dispense button 238 which may cause the selected beverage 220 and/or water 235 to be dispensed at a predetermined flow rate and the selected flavor or ingredient option 230 to be dispensed at another predetermined flow rate. The flow rates of the selected beverage 220, water 235, and/or ingredient options 230 may be controlled by valve assemblies 140. In embodiments, the user may select the beverage options 220, water options 235, and/or flavor ingredient options 230 in any order.

In one specific example, a user may first select a flavor or ingredient option 230 labeled "L" in FIG. 5B which may correspond with a lime flavoring. The user may also select a beverage option 220 labeled "2" in FIG. 5B which may correspond with a lemon-lime soft drink. The user may then press the dispense button 238 and the dispense device 100 may simultaneously dispense a lemon-lime syrup at a first predetermined flow rate, carbonated water at a second predetermined flow rate, and lime flavored syrup at a third predetermined flow rate until the user releases the dispense button 238. In some embodiments, as described above, the carbonated water may continue dispensing after the user releases the dispense button 238 to rinse any residual flavors or colorings from the nozzle 102.

Similarly, in another specific example, a user may want water 235 (carbonated water or noncarbonated water) with a flavor or ingredient 230 addition. In such an example, the user may first select a flavor or ingredient option 230 labeled "S" in FIG. 5B which may correspond with a lemon flavoring. Next the user may a select a water 235 option labeled "W" in FIG. 5B which may correspond with noncarbonated water. The user may then press the dispense button 238 and the dispense device 100 may simultaneously dispense noncarbonated water at a first predetermined flow rate, and lemon flavored syrup at a second predetermined flow rate until the user releases the dispense button 238. In some embodiments, as described above, the water 235 may continue dispensing after the user releases the dispense button 238 to rinse any residual flavors or colorings from the nozzle 102.

As discussed above, and as shown for example in FIGS. 1A, 1B, and 4, the beverage dispensing system 50 may include one or more control units 500 which may be interfaced with user interface 200 to receive actions from the user interface 200 and to perform other actions, for example, control unit 500 may control the dispensing system 50 to dispense beverages from the dispensing head 102 as selected by a user. Control unit 500 may, for example, manage the operation of user interface 200. Control unit 500 may also control, for example, pumps 310 and valve assemblies 140 to dispense beverages from the dispense device 100 based on inputs and/or beverage selections from the user interface 200. Control unit 500 may be located in various locations. For example, control unit 500 may be located within the ingredient system 300, within the dispense device 100, and/or other various locations within the dispensing system 50.

As seen in FIGS. 4A and 4B the user interface 200 may be interfaced with the control unit 500 which may be interfaced with pumps 310 and/or valve assemblies 140. The interface may provide operative communication between the control unit 500 and various other parts of the dispensing system 50 including the user interface 200, the pumps 310, and the valve assemblies 140.

In some embodiments, the dispensing system 50 may also comprise a network connection 510, which may also provide one or more user inputs (as well as transmit outgoing signals), coupling dispensing system 50 to a communication network, such as a LAN or the Internet. The dispensing system 50 may be connected to a communication network via twisted pair wires, coaxial cable, fiber optics or other media. Alternatively, radio waves may be used to connect one or more beverage dispensing systems 50 to the communication network. In one such embodiment, one or more dispensing systems 50 and/or dispense devices 100 may be in communication with each other and readily transmit and receive information regarding other dispensing systems 50 and/or dispense devices 100, including a unique formula dispensed. In one embodiment, a plurality of dispensing systems 50 and/or dispense devices 100 may each be coupled to each other through a central server. Yet in another embodiment, the dispensing systems 50 and/or dispense devices 100 may communicate directly with each other.

Control unit 500 may include one or more processors, electronic circuitry, memory and/or discrete logic. Processors may be configured to execute instructions on computer-readable medium, received from a user interface device 200 and/or a network connection. In some embodiments, control unit 500 may include a clock, calendaring software, interface to sensors, such as beverage availability or other stock levels. Control unit 500 may be connected to user interface 200 to operate the touch pad and/or touch screen and to receive user input from user interface 200. For example, in some embodiments, control unit 500 may receive coordinates representing a location on the user interface 200 touched by a user.

Figure 6:
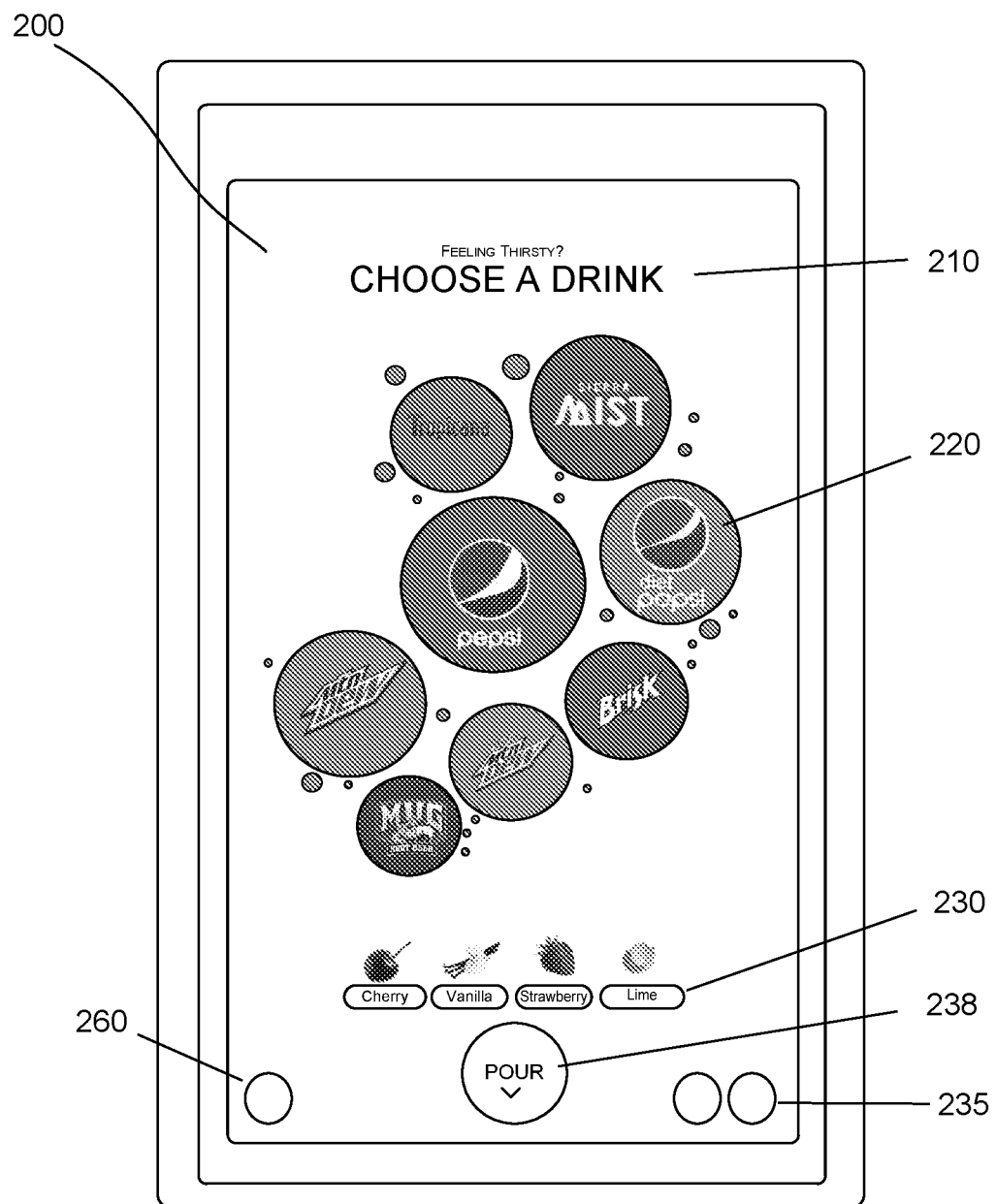
FIG. 6 is an exemplary user interface screen in accordance with various aspects of the disclosure.

As discussed above, in some embodiments the user interface 200 may be a touch screen. One exemplary touch screen is shown in FIG. 6. The touch screen or user interface 200 may be included on the dispense device 100 or may be included separate from the dispense device 100.

In some embodiments, the user interface 200 may be controlled to direct or lead a user through an interaction to select a beverage. For example, artwork or graphics (objects) associated with various beverage and/or water options 220, 235 may first be shown to a user. As discussed above this can include, for example, a regular cola beverage, a diet cola beverage, one or more non-cola carbonated beverages, such as a lemon-lime flavored carbonated beverage or some other fruit-flavored drink (e.g., orange flavored carbonated beverage, and/or root beer); one or more non-carbonated beverages, such as a tea and/or a lemonade; and carbonated and noncarbonated water. Next, the user interface 200 may display various flavor or ingredient addition or removal options 230 including, for example, vanilla, strawberry, raspberry, lemon, lime, etc. In some embodiments, the user interface 200 may also include water options 235 including for example options for noncarbonated water or carbonated water. Finally, a "Pour" or "Fill" object may be shown on the user interface 200 to alert the user that the beverage dispensing process has progressed to the final stage and the beverage may be dispensed.

In some embodiments, user interface 200 may be configured based on availability of a beverage product/syrup or a flavoring. For example, should a flavoring be unavailable, control unit 500 may control the user interface 200 to not show objects related to that flavoring.

In some embodiments, the user interface 200 may include multiple screens. For example, some screens may provide images related to carbonated beverages while another screen may provide images related to juices. In some embodiments, the user interface 200 may include a title area or title screen 210 where graphics, text or other visual information may be placed in order to invite a consumer to make various selections. Some embodiments may include a cancel selection area 260.

In some embodiments, the user interface 200 may be configured based on the time of day. For example, during morning hours, control unit 500 may control the user interface 200 to show objects related to juices while during afternoon or evening hours, control unit 500 may control user interface 200 to show objects related to carbonated beverages.

When a user selects an object in the user interface 200, various other portions and/or screens of the user interface may be shown. For example, a first screen providing beverage selections 220, 235 may be provided. Once a beverage has been selected, various other portions and/or screens may be provided to indicate a valid next selection for the user. For example, a "pour" option 238 and/or screen may be shown or a flavor addition portion 230 may be shown to indicate to the user that either of these portions are valid next selections.

The user interface 200 may timeout in some embodiments, so that user input may no longer be accepted from certain areas and the interface may reset to an initial state.

In some embodiments, the dispensing system 50 may include an input/output system which may include a number of ports, such as USB port(s) and/or Ethernet port(s) for sending and receiving information. The input/output system may be used by a user to change any number of variables within the dispensing system 50. For example, the input/output system may be used to perform maintenance on the dispensing system 50, adjust flow rates of the beverage ingredients, and/or change variables related to the user interface 200.

In some embodiments, the interface 200 may include a "cleaning" mode wherein the user interface 200 may become unresponsive to input for a predetermined period, such as 15 seconds. The "clean" mode disables user inputs to facilitate wiping or otherwise touching of the user interface 200 for cleaning, without dispensing beverages. At the expiration of the predetermined period, the user interface 200 may exit the "cleaning" mode and return to normal operation.

In some embodiments, the dispensing system 50 may include other features and/or systems. For example, the dispensing system 50 may also comprise auto sanitizing systems. Those skilled in the art will recognize that locking of a portion of the system may be used so that a sanitizing cycle may be run. For example, a lock out feature with recognition of the sanitizer may be provided to prevent unintentional beverage dispensing. The lock out feature with recognition of the sanitizer may have mechanical and electrical safety redundancy.

The dispensing system 50 may comprise and/or communicate with a social media system or application. For example, when a mobile device of a consumer is within a predetermined distance from a sensor linked to the dispensing system 50, a message may be sent to the consumer's mobile device that queries the consumer whether the consumer would like to purchase a beverage. The social media system or application may download to the dispensing system 50 the preference or preferences of a consumer based on the consumer's past purchases and/or identified preferences.

The dispensing system 50 may also receive a beverage order from a consumer via a social media system or application, including but not limited to the social media system or application of a seller of beverages, including but not limited to restaurants, theaters, other entertainment venues, and manufacturers and/or distributors of beverages. A consumer may order a beverage prior to arriving at dispense device 100 so that the drink may be prepared and placed in a cup by the time or close to the time the consumer arrives at the dispense device 100.

Thus, the system may recognize an individual and make certain decisions regarding what beverage(s) or type of beverage(s) to offer the individual. The system may change what the system traditionally offers if such a beverage has been ordered by the individual in the past, or the individual has identified the beverage as a preference on social media system or application.

The invention(s) herein have been described and illustrated with reference to the embodiments of the figures, but it should be understood that the features of the invention(s) are susceptible to modification, alteration, changes or substitution without departing significantly from the spirit of the invention(s). For example, the dimensions, number, size and shape of the various components may be altered to fit specific applications. Accordingly, the specific embodiments illustrated and described herein are for illustrative purposes only and the invention(s) are not limited except by the following claims and their equivalents.

What is claimed is:

1. A liquid dispensing system, comprising:
   a handheld liquid dispense device comprising:
     a body portion;
     a dispensing head; and
     a user interface comprising a display screen configured to receive a user selection for a beverage at a beverage selection button on the display screen and a separate user selection for a flavor ingredient to be dispensed with the beverage at a flavor ingredient selection button on the display screen;
   an ingredient system located remotely from the handheld liquid dispense device;
   piping extending from the ingredient system to the handheld liquid dispense device,
   the ingredient system having a plurality of beverage ingredient sources and configured to supply a plurality of beverage ingredients to the piping for the dispensing of customized beverages from the handheld liquid dispense device,
   wherein dispensing a customized beverage comprises dispensing the beverage and the separately selected flavor ingredient simultaneously from the dispensing head.

2. The liquid dispensing system of claim 1, further comprising a plurality of flow control valves in fluid communication with the plurality of beverage ingredient sources, each flow control valve associated with a respective beverage ingredient of the plurality of beverage ingredients.

3. The liquid dispensing system of claim 1, wherein the flavor ingredient is a flavor addition syrup.

4. The liquid dispensing system of claim 1, wherein the user interface is configured to transmit an input directing the discharge of the customized beverage from the handheld liquid dispense device.

5. The liquid dispensing system of claim 1, wherein the display screen comprises a touchpad.

6. The liquid dispensing system of claim 1, wherein the display screen comprises a touchscreen.

7. The liquid dispensing system of claim 1, wherein at least a portion of the piping comprises a main bundle comprising a plurality of separate lines, with each line corresponding to a particular beverage ingredient.

8. The liquid dispensing system of claim 1, wherein the customized beverage is dispensed in response to a user selection of a dispense button on the display screen.

9. The liquid dispensing system of claim 1, wherein the ingredient system further comprises a water treatment system, the water treatment system configured to treat water entering the water treatment system so that it has at least one predetermined characteristic upon exiting the water treatment system.

10. The liquid dispensing system of claim 9, wherein the at least one predetermined characteristic of the water upon exiting the water treatment system is a temperature that is different than the temperature of the water entering the water treatment system.

11. The liquid dispensing system of claim 1, wherein the handheld liquid dispense device is configured to receive a first beverage ingredient from the ingredient system and dispense the first beverage ingredient from the dispensing head at a first flow rate.

12. The liquid dispensing system of claim 11, wherein the handheld liquid dispense device is configured to receive a second beverage ingredient from the ingredient system and dispense the second beverage ingredient from the dispensing head at a second flow rate,
wherein the second flow rate is different than the first flow rate; and
wherein the first ingredient and the second ingredient are dispensed simultaneously.

13. The liquid dispensing system of claim 12, wherein the handheld liquid dispense device is configured to receive the flavor ingredient from the ingredient system and dispense the flavor ingredient from the dispensing head at a third flow rate,
wherein the third flow rate is different than the first and second flow rates; and
wherein the first ingredient, the second ingredient, and the flavor ingredient are dispensed simultaneously.

14. The liquid dispensing system of claim 13, wherein the first beverage ingredient is a soda syrup, wherein the second beverage ingredient is a water, and wherein the flavor ingredient is a flavor addition syrup.

15. A liquid dispensing system, comprising:
a handheld liquid dispense device comprising:
a body portion; and
a dispensing head;
an ingredient system located remotely from the handheld liquid dispense device;
piping extending from the ingredient system to the handheld liquid dispense device,
the ingredient system having a plurality of beverage ingredient sources and configured to supply beverage ingredients to the piping for the dispensing of customized beverages from the handheld liquid dispense device;
a user interface configured to transmit an input directing the discharge of a customized beverage from the handheld liquid dispense device, the user interface comprising a display screen located on the handheld liquid dispense device and comprising a beverage selection button, a flavor ingredient selection button, and a dispense button; and
a control unit configured to:
receive a first user selection for a beverage via a user selection of the beverage selection button;
receive a separate user selection modifying the beverage with a flavor ingredient via a user selection of the flavor ingredient selection button; and
dispense, in response to a user selection of the dispense button, the customized beverage based on the beverage and flavor ingredient selections, wherein dispensing the customized beverage comprises dispensing the beverage and the flavor ingredient simultaneously from the dispensing head.

16. The liquid dispensing system of claim 15, wherein the flavor ingredient is a flavor addition syrup.

17. The liquid dispensing system of claim 15, wherein the control unit is further configured to provide a plurality of flavor ingredient selection buttons to select from on the user interface and wherein the plurality of flavor ingredient selection buttons is based upon the presence of specific ingredients detected in the dispensing system.

18. The liquid dispensing system of claim 15, wherein the control unit is further configured to provide a plurality of beverage selection buttons to select from on the user interface and wherein the plurality of beverage selection buttons is based upon the presence of specific ingredients detected in the dispensing system.

19. A liquid dispensing system, comprising:
a handheld liquid dispense device comprising:
a body portion; and
a dispensing head;
an ingredient system located remotely from the handheld liquid dispense device;
piping extending from the ingredient system to the handheld liquid dispense device,
the ingredient system having a plurality of beverage ingredient sources and configured to supply beverage ingredients to the piping for the dispensing of a customized beverage from the handheld liquid dispense device;
a plurality of flow control valves, each flow control valve associated with a beverage ingredient; and
a user interface located on the handheld liquid dispensing device and comprising a display screen comprising a beverage options region, an ingredient options region, and a dispense button, wherein the display screen is configured to receive a first user selection for a beverage at the beverage options region, a second user selection for a flavor addition syrup modifying the beverage at the ingredient options region, and a user instruction at the dispense button to dispense the customized beverage including the first user selection and the second user selection;
wherein the handheld liquid dispense device is configured to receive a first beverage ingredient from the ingredient system and dispense the first beverage ingredient from the dispensing head at a first flow rate;
wherein the handheld liquid dispense device is configured to receive a second beverage ingredient from the ingredient system and dispense the second beverage ingredient from the dispensing head at a second flow rate,
wherein the handheld liquid dispense device is configured to receive a third beverage ingredient from the ingredient system and dispense the third beverage ingredient from the dispensing head at a third flow rate;
wherein the first ingredient, the second ingredient, and the third ingredient are dispensed from the dispensing head simultaneously when dispensing the customized beverage; and wherein the first beverage ingredient is a soda syrup, wherein the second beverage ingredient is a water, and wherein the third beverage ingredient is the flavor addition syrup.

\* \* \* \* \*